(12) United States Patent
Konishi et al.

(10) Patent No.: US 11,912,103 B2
(45) Date of Patent: Feb. 27, 2024

(54) AIR CONDITIONING DEVICE

(71) Applicant: TOYOTA JIDOSHA KABUSHIKI KAISHA, Toyota (JP)

(72) Inventors: Makoto Konishi, Nagoya (JP); Kento Hosono, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 214 days.

(21) Appl. No.: 17/452,244

(22) Filed: Oct. 26, 2021

(65) Prior Publication Data

US 2022/0227206 A1 Jul. 21, 2022

(30) Foreign Application Priority Data

Jan. 18, 2021 (JP) ................... 2021-005583

(51) Int. Cl.
*B60H 1/00* (2006.01)
*B60H 1/34* (2006.01)

(52) U.S. Cl.
CPC ....... *B60H 1/00764* (2013.01); *B60H 1/3414* (2013.01)

(58) Field of Classification Search
CPC .............. B60H 1/00764; B60H 1/3414; B60H 1/00821; B60H 1/00378; B60H 1/00357; B60H 2001/3471
USPC .................................................. 454/75, 202
See application file for complete search history.

(56) References Cited

U.S. PATENT DOCUMENTS

2018/0178614 A1* 6/2018 Ferri ................. B60H 1/00864

FOREIGN PATENT DOCUMENTS

| JP | 08-183326 A | | 7/1996 |
|---|---|---|---|
| JP | 11-198645 A | | 7/1999 |
| JP | 2003-326964 A | | 11/2003 |
| JP | 2003326964 A | * | 11/2003 |

* cited by examiner

*Primary Examiner* — Allen R. B. Schult
*Assistant Examiner* — William C Weinert
(74) *Attorney, Agent, or Firm* — Oblon, McClelland, Maier & Neustadt, L.L.P.

(57) ABSTRACT

An air conditioning device mounted on a vehicle in which a cabin on which an occupant boards is open to an outside of the vehicle includes: a front air blowing port provided further forward than a boarding position on which the occupant boards in a front-rear direction of the vehicle to blow temperature-adjusted air toward the boarding position; a rear air blowing port provided further rearward than the boarding position in the front-rear direction of the vehicle to blow temperature-adjusted air toward the boarding position; and a control unit for controlling the air conditioning device. The control unit performs control to blow the air from the front air blowing port when the vehicle travels forward, and performs control to blow the air from the rear air blowing port when the vehicle travels rearward.

6 Claims, 4 Drawing Sheets

AIR CONDITIONING DEVICE

CROSS-REFERENCE TO RELATED APPLICATION

This application claims priority to Japanese Patent Application No. 2021-005583 filed on Jan. 18, 2021, incorporated herein by reference in its entirety.

BACKGROUND

1. Technical Field

The present disclosure relates to an air conditioning device.

2. Description of Related Art

As an air conditioning device mounted on an open cabin type vehicle such as a forklift, an air conditioning device that controls the blowing direction of temperature-adjusted air is known. Japanese Unexamined Patent Application Publication No. 2003-326964 (JP 2003-326964 A) describes a technique of controlling a louver of an air outlet provided in a front portion of a ceiling of the vehicle to blow air downward when the vehicle travels forward and to blow air in the traveling direction of the vehicle when the vehicle travels rearward, that is, to blow air rearward when the vehicle travels rearward. Thus, when the vehicle travels rearward, the temperature-adjusted air is pushed by the opposing wind generated by inertia due to the traveling of the vehicle, enabling the air in the vicinity of a passenger to become a mixture of the temperature-adjusted air and the outside air.

SUMMARY

However, when blowing air toward the moving direction of the vehicle, the temperature-adjusted air is agitated by receiving the opposing wind generated by the inertia of the air. Thus, there is a possibility that the temperature-adjusted air does not flow to the assumed position. Therefore, a technique capable of sending the temperature-adjusted air to a desired position has been required.

The present disclosure has been made in order to solve the above-described issue, and can be implemented in the following modes.

(1) According to an aspect of the present disclosure, there is provided an air conditioning device mounted on a vehicle in which a cabin on which an occupant boards is open to an outside of the vehicle. The air conditioning device includes: a front air blowing port provided further forward than a boarding position on which the occupant boards in a front-rear direction of the vehicle to blow temperature-adjusted air toward the boarding position; a rear air blowing port provided further rearward than the boarding position in the front-rear direction of the vehicle to blow temperature-adjusted air toward the boarding position; and a control unit for controlling the air conditioning device. The control unit performs control to blow the air from the front air blowing port when the vehicle travels forward, and performs control to blow the air from the rear air blowing port when the vehicle travels rearward. According to the air conditioning device of this mode, the control unit controls the air conditioning device so that the temperature-adjusted air is blown out in the direction opposite to the moving direction of the vehicle. Therefore, the air conditioning device can blow the air toward the position in which the occupant boards, without blowing air against the airflow caused by the movement of the vehicle. As a result, the temperature-adjusted air can be sent to the desired position.

(2) In the air conditioning device of the above aspect, when a speed of the vehicle is equal to or less than a predetermined speed, the control unit may perform control to blow the air from the front air blowing port and the rear air blowing port. With such an aspect, for example, when a strong airflow does not occur by the movement of the vehicle, air can be blown from both the front air blowing port and the rear air blowing port. Therefore, it is possible to perform air conditioning more efficiently compared to the case where air is blown only from either one of the front air blowing port and the rear air blowing port.

(3) In the air conditioning device of the above aspect, the vehicle may be a working vehicle that lifts a placed object to transport the object. In such an aspect, working vehicles travel rearward frequently. Therefore, blowing the air from the rear air blowing port is particularly effective when the vehicle travels rearward.

(4) In the air conditioning device of the above aspect, the rear air blowing port may include a first rear air blowing port provided on a right portion of the vehicle and a second rear air blowing port provided on a left portion of the vehicle. With such an aspect, even when receiving wind from the right side of the vehicle or when receiving wind from the left side of the vehicle, it is possible to send the temperature-adjusted air to a desired position.

(5) In the air conditioning device of the above aspect, the front air blowing port may include a first front air blowing port provided on a right portion of the vehicle and a second front air blowing port provided on a left portion of the vehicle. With such an aspect, even when receiving wind from the right side of the vehicle or when receiving wind from the left side of the vehicle, it is possible to send the temperature-adjusted air to a desired position.

(6) In the air conditioning device of the above aspect, the vehicle may include a steering wheel that supports and travels the vehicle, and changes a traveling direction of the vehicle, and another wheel that supports and travels the vehicle together with the steering wheel. The air conditioning device may include a wind direction adjusting unit able of changing, to the right and left, an air blowing direction of at least an air blowing port on the same side as the steering wheel with respect to the boarding position, of the front air blowing port and the rear air blowing port. When the vehicle changes the traveling direction while traveling in a direction from the other wheel toward the steering wheel, the control unit may control the wind direction adjusting unit such that the air blowing port on the same side as the steering wheel blows the air in a direction adjusted to a direction toward which the vehicle changes. With such an aspect, since the control unit controls the wind direction adjusting unit, it is possible to send the temperature-adjusted air to the space of the moving destination of the boarding position when the vehicle changes the direction.

The present disclosure can be implemented in various aspects. For example, it is possible to implement the present disclosure in the aspect of a vehicle having an air conditioning device of this aspect, an air conditioning method using the air conditioning device of this aspect, or the like.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. First Embodiment

Figure 1:
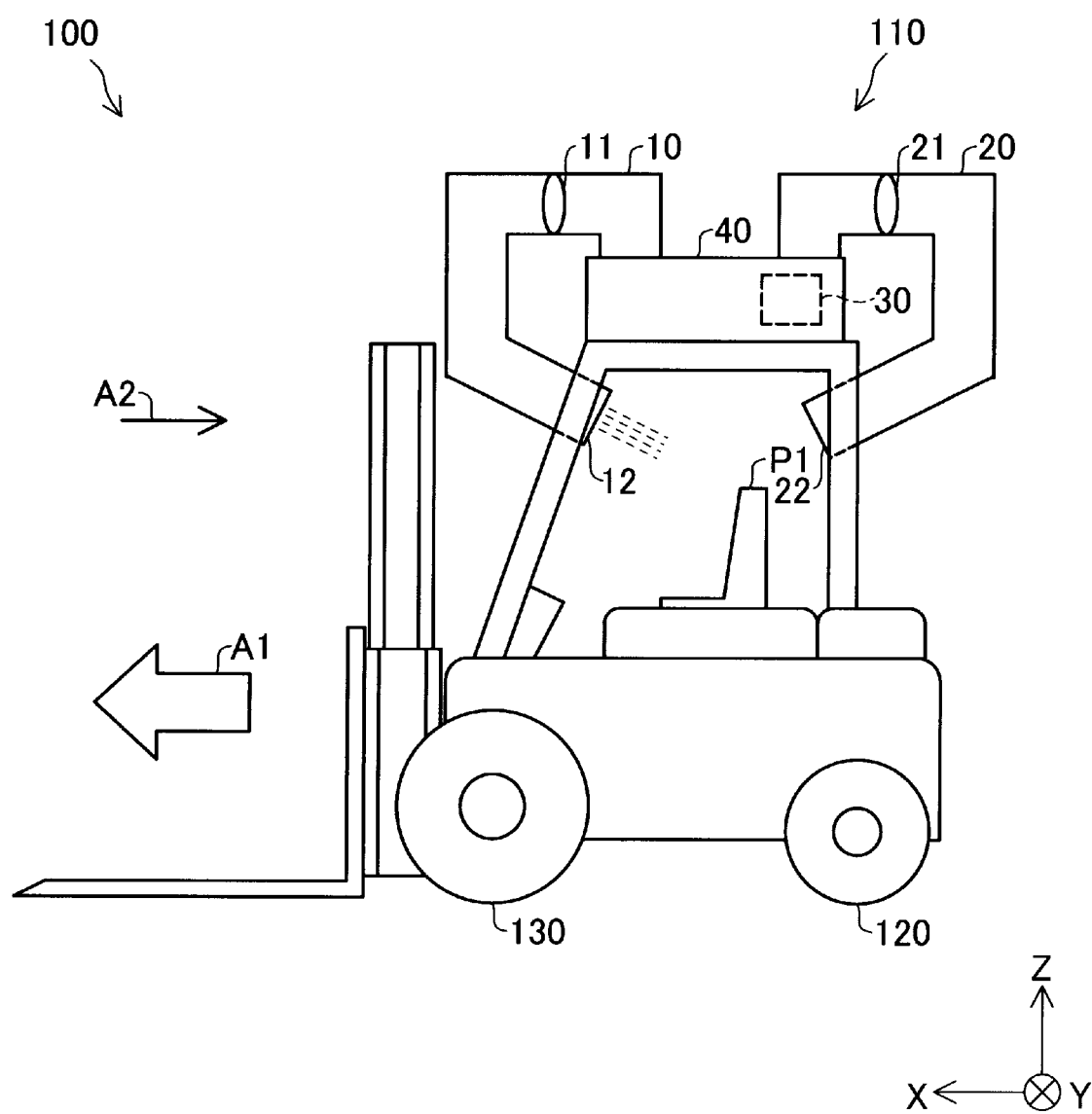
FIG. 1 is an explanatory diagram showing a schematic configuration of an air conditioning device.

FIG. 1 is an explanatory diagram showing a schematic configuration of an air conditioning device 110 in a first embodiment of the present disclosure. The air conditioning device 110 is mounted on a vehicle 100 in which a cabin on which an occupant boards is open to the outside of the vehicle. In the present embodiment, the vehicle 100 is a working vehicle that lifts a placed object to transport the object. The vehicle 100 is, for example, a forklift. The vehicle 100 may be a tractor. FIG. 1 shows an x-axis, a y-axis, and a z-axis that are perpendicular to each other. The x-axis indicates the front-rear direction of the vehicle 100, the y-axis indicates the right-left direction of the vehicle 100, and the z-axis indicates the up-down direction of the vehicle 100. These axes correspond to the axes shown in FIG. 1 and later.

The vehicle 100 includes steering wheels 120 and other wheels 130. The steering wheels 120 are wheels that support and travel the vehicle 100, and change the traveling direction of the vehicle 100. The other wheels 130 are wheels that support and travel the vehicle 100 together with the steering wheels 120. In the present embodiment, the rear wheels (minus x-axis direction side) of the vehicle 100 are the steering wheels 120 and the front wheels (plus x-axis direction side) of the vehicle 100 are the other wheels 130.

The air conditioning device 110 is a spot air conditioner for blowing air to a limited target. The air conditioning device 110 blows the air, targeting the occupant aboard the open cabin of the vehicle 100. The air conditioning device 110 includes a front duct 10, a rear duct 20, a control unit 30, and an air conditioning unit 40. The air conditioning unit 40 generates temperature-adjusted air. In the present embodiment, the air conditioning unit 40 is disposed on the upper portion of the vehicle 100.

The front duct 10 has a front damper 11 and a front air blowing port 12. The front duct 10 is a pipe for circulating the air whose temperature has been adjusted by the air conditioning unit 40. The front damper 11 is provided in the front duct 10 to open and close the front duct 10. The front air blowing port 12 is an open end of the front duct 10. The front air blowing port 12 is provided further forward (plus x-axis side) and upward (plus z-axis side) than a boarding position P1 in the front-rear direction and the up-down direction of the vehicle 100, respectively. More specifically, the front air blowing port 12 is disposed above the occupant's head so as not to interfere with the view of the occupant located in the boarding position P1. The front air blowing port 12 blows the temperature-adjusted air toward the boarding position P1 in which the occupants boards.

The rear duct 20 has a rear damper 21 and a rear air blowing port 22. The rear duct 20 is a pipe for circulating the air whose temperature has been adjusted by the air conditioning unit 40. The rear damper 21 is provided in the rear duct 20 to open and close the rear duct 20. The rear air blowing port 22 is an open end of the rear duct 20. The rear air blowing port 22 is provided further rearward (minus x-axis side) and upward (plus z-axis side) than the boarding position P1 in the front-rear direction and the up-down direction of the vehicle 100, respectively. The rear air blowing port 22 blows the temperature-adjusted air toward the boarding position P1.

The control unit 30 controls the air conditioning device 110. The control unit 30 performs control to blow the air from the front air blowing port 12 when the vehicle 100 travels forward. In contrast, the control unit 30 performs control to blow the air from the rear air blowing port 22 when the vehicle 100 travels rearward. The control unit 30 performs these controls, for example, by controlling the front damper 11 and rear damper 21. The control unit 30 can determine the traveling direction of the vehicle 100 from the directions of the steering wheels 120 of the vehicle 100. The control unit 30 is composed of, for example, a microcomputer or the like composed of a central processing unit (CPU) provided in the air conditioning unit 40, a random access memory (RAM), and a read-only memory (ROM), and these controls are implemented when the microcomputer executes a program installed in advance. However, some or all of these controls may be implemented in hardware circuitry.

When the vehicle 100 moves in the arrow A1 direction (plus x-axis direction), the inertia generates an opposing wind toward the arrow A2 direction (minus x-axis direction) that is the direction opposite to the arrow A1 direction. In this case, the control unit 30 performs control so as to blow the air from the front air blowing port 12. Therefore, it is possible to send the temperature-adjusted air blown out from the front air blowing port 12 to the boarding position P1 along the opposing wind. Further, the temperature-adjusted air blown out from the rear air blowing port 22 can be suppressed from being agitated by the opposing wind.

In contrast, when the vehicle 100 moves in the arrow A2 direction, the inertia generates an opposing wind toward the arrow A1 direction that is the direction opposite to the arrow A2 direction. In this case, the control unit 30 performs control so as to blow the air from the rear air blowing port 22. Therefore, it is possible to send the temperature-adjusted air blown out from the rear air blowing port 22 to the boarding position P1 along the opposing wind. Further, the temperature-adjusted air blown out from the front air blowing port 12 can be suppressed from being agitated by the opposing wind.

According to the air conditioning device 110 of the present embodiment described above, the control unit 30 controls the air conditioning device 110 so that the temperature-adjusted air is blown out in the direction opposite to the moving direction of the vehicle 100. Therefore, the air conditioning device 110 can blow the air toward the boarding position P1 in which the occupant boards, without blowing air against the airflow caused by the movement of the vehicle 100. As a result, the temperature-adjusted air can be sent to the desired position.

The vehicle 100 is a working vehicle. Working vehicles travel rearward frequently. Therefore, blowing the air from the rear air blowing port 22 is particularly effective when the vehicle 100 travels rearward.

B. Second Embodiment

Figure 2:
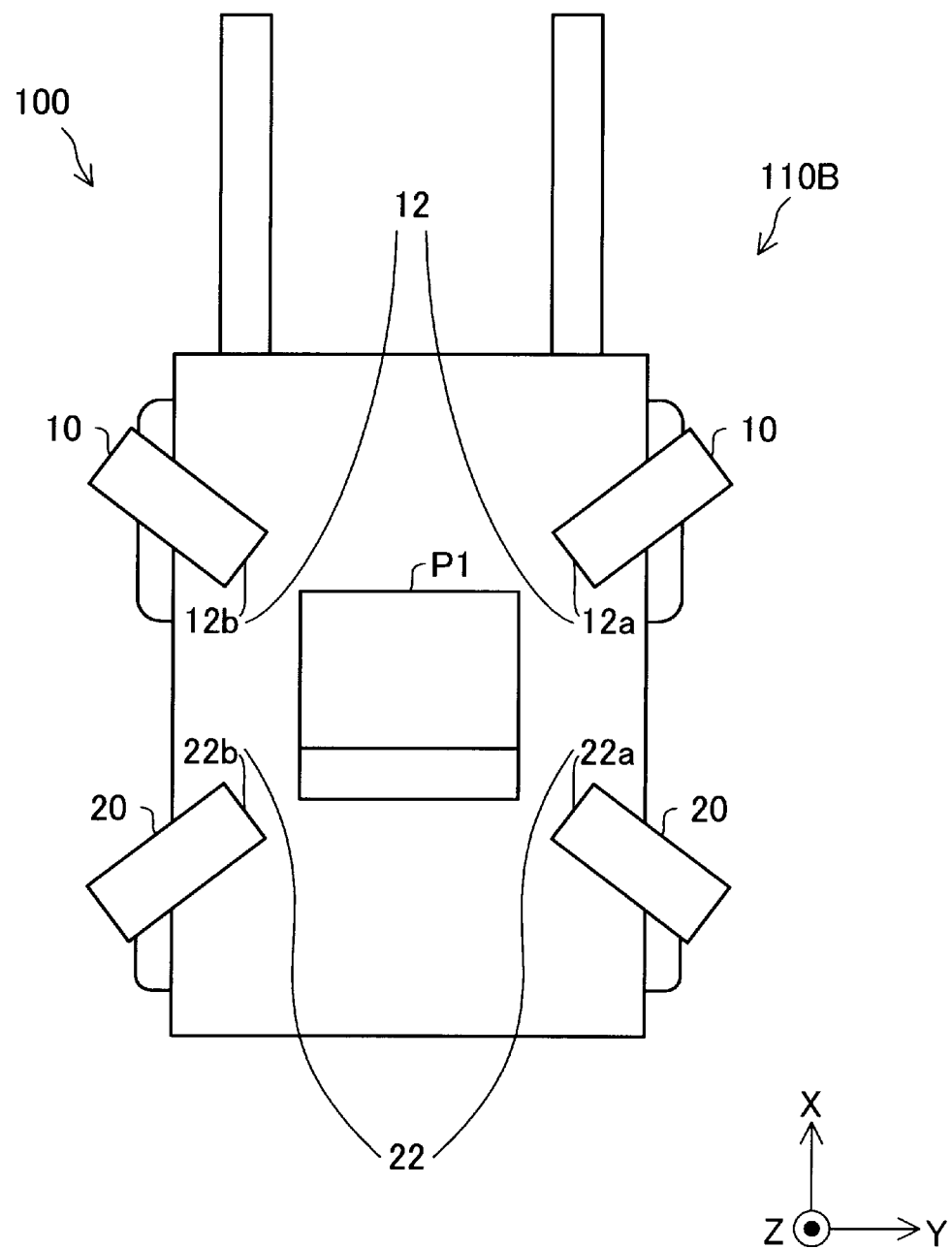
FIG. 2 is an explanatory diagram showing a schematic configuration of an air conditioning device in a second embodiment.

FIG. 2 is an explanatory diagram showing a schematic configuration of an air conditioning device 110B in a second embodiment. The air conditioning device 110B in the second embodiment differs from the air conditioning device 110 in the first embodiment in that, the front air blowing port 12 includes a first front air blowing port 12a and a second front air blowing port 12b, and that the rear air blowing port 22 includes a first rear air blowing port 22a and a second rear air blowing port 22b. Other configurations are the same as those in the first embodiment. FIG. 2 is a diagram of the vehicle 100 viewed from the upward direction (plus z-axis direction). For convenience of illustration, the control unit 30 and the air conditioning unit 40 are omitted.

As shown in FIG. 2, the front air blowing port 12 includes the first front air blowing port 12a provided on the right portion of the vehicle 100 (plus y-axis side), and the second front air blowing port 12b provided on the left portion of the vehicle 100 (minus y-axis side). The rear air blowing port 22 includes the first rear air blowing port 22a provided on the right portion of the vehicle 100, and the second rear air blowing port 22b provided on the left portion of the vehicle 100.

When the vehicle 100 travels forward, the control unit 30 performs control to blow the air from the first front air blowing port 12a and the second front air blowing port 12b. In contrast, when the vehicle 100 travels rearward, the control unit 30 performs control to blow the air from the first rear air blowing port 22a and the second rear air blowing port 22b.

According to the air conditioning device 110B of the second embodiment described above, the rear air blowing port 22 includes the first rear air blowing port 22a and the second rear air blowing port 22b to the right and left of the vehicle 100. Therefore, for example, even when receiving wind from the right side of the vehicle or when receiving wind from the left side of the vehicle, it is possible to send the temperature-adjusted air to a more desired position by the air blown from the first rear air blowing port 22a. Further, the front air blowing port 12 includes the first front air blowing port 12a and the second front air blowing port 12b to the right and left of the vehicle 100. Therefore, for example, even when receiving wind from the right side of the vehicle or when receiving wind from the left side of the vehicle, it is possible to send the temperature-adjusted air to a more desired position by the air blown from the first front air blowing port 12a.

C. Third Embodiment

Figure 3:
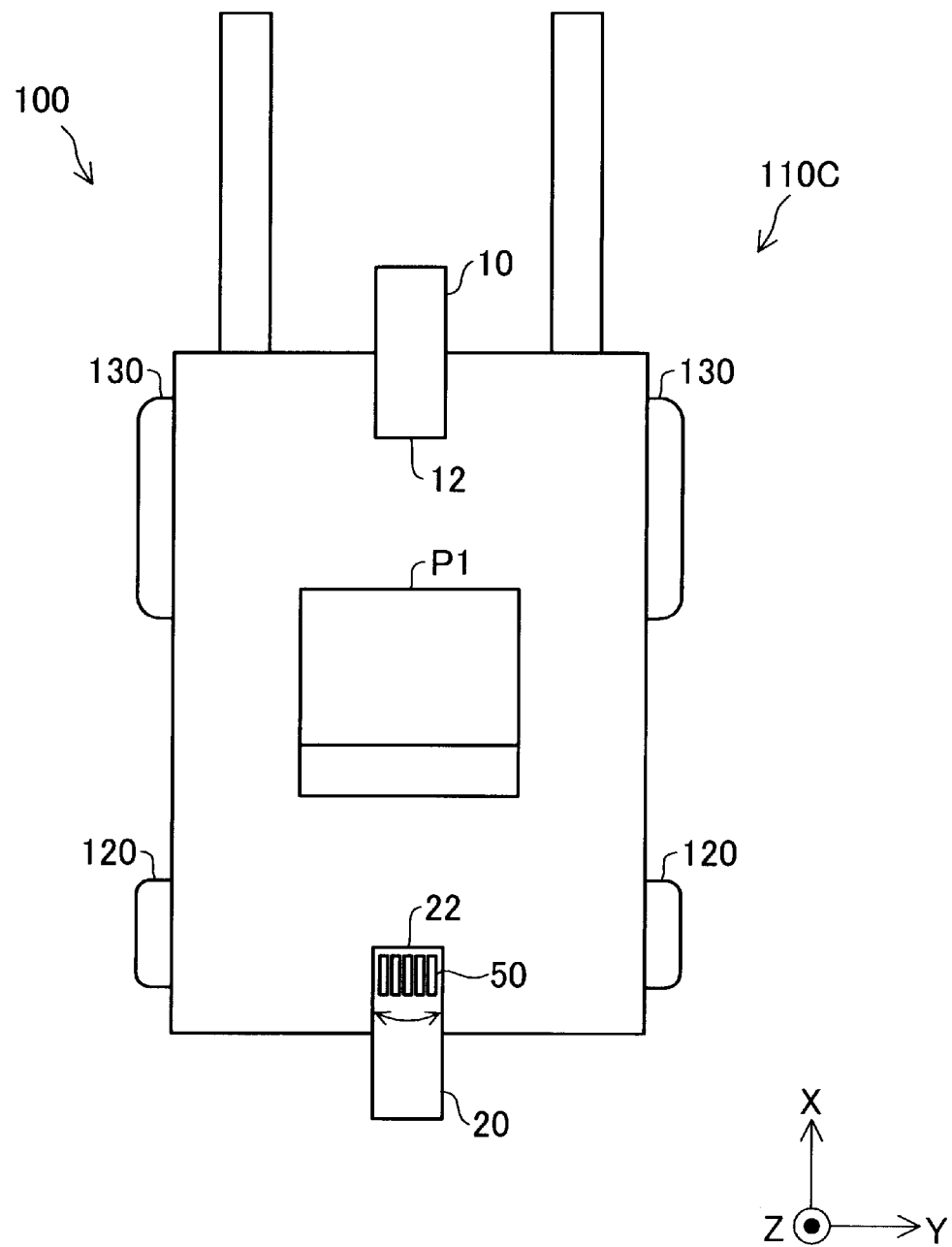
FIG. 3 is an explanatory diagram showing a schematic configuration of an air conditioning device in a third embodiment.

FIG. 3 is an explanatory diagram showing a schematic configuration of an air conditioning device 110C in a third embodiment. The air conditioning device 110C in the third embodiment differs from the air conditioning device 110 in the first embodiment in that the air conditioning device 110C includes a wind direction adjusting unit 50, and other configurations are the same as those in the first embodiment. FIG. 3 is a diagram of the vehicle 100 viewed from the upward direction (plus z-axis direction). For convenience of illustration, the control unit 30 and the air conditioning unit 40 are omitted.

The wind direction adjusting unit 50 can change, to the right and left, the air blowing direction of the rear air blowing port 22 on the same side as the steering wheels 120 with respect to the boarding position P1. In the present embodiment, the wind direction adjusting unit 50 is a louver provided in the rear air blowing port 22 and a motor for driving the louver. The louver is composed of a plurality of wing plates having elongated plate shapes that is arranged in parallel with gaps therebetween.

When the vehicle 100 changes the traveling direction while traveling in the direction from the other wheels 130 toward the steering wheels 120 (minus x-axis direction), the control unit 30 controls the wind direction adjusting unit 50 so that the rear air blowing port 22 blows the air in a direction adjusted to a direction toward which the vehicle 100 changes.

According to the air conditioning device 110C of the third embodiment described above, since the control unit 30 controls the wind direction adjusting unit 50, it is possible to send the temperature-adjusted air to the space of the moving destination of the boarding position P1 when the vehicle 100 changes the direction.

D. Fourth Embodiment

Figure 4:
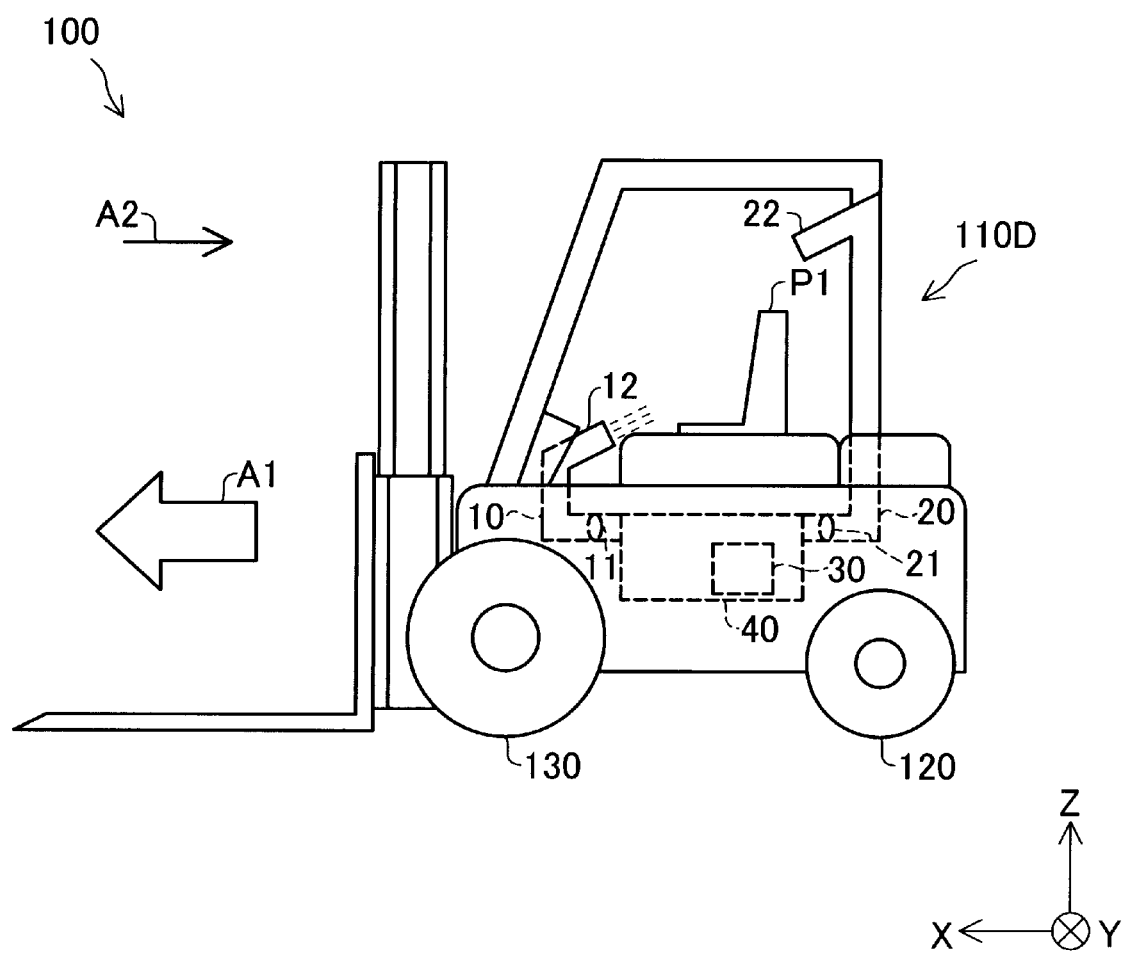
FIG. 4 is an explanatory diagram showing a schematic configuration of an air conditioning device in a fourth embodiment.

FIG. 4 is an explanatory diagram showing a schematic configuration of an air conditioning device 110D in a fourth embodiment. The air conditioning device 110D in the fourth embodiment differs from the air conditioning device 110 in the first embodiment in that the air conditioning device 110D is disposed in a lower portion of the vehicle 100, and other configurations are the same as those in the first embodiment. As shown in FIG. 4, the front air blowing port 12 is provided on the front lower portion of the vehicle 100. The fourth embodiment also has substantially the same effect as the first embodiment.

E. Other Embodiments (E1) In the embodiments described above, the vehicle 100 is a working vehicle that lifts a placed object to transport the object. The configuration is not limited thereto, and the vehicle 100 may be, for example, a three-wheel vehicle such as a tuk-tuk or a golf cart.

(E2) In the embodiments described above, the air conditioning device 110 includes only one air conditioning unit 40. The configuration is not limited thereto, and the air conditioning device 110 may include a plurality of air conditioning units 40. More specifically, the air conditioning device 110 may include an air conditioning unit 40 for each air blowing port. For example, the air conditioning device 110 may include a front air conditioning unit for generating temperature-adjusted air blown only from the front air blowing port 12, and a rear air conditioning unit for generating temperature-adjusted air blown only from the rear air blowing port 22.

(E3) In the embodiments described above, the control unit 30 may perform control to blow air from both the front air blowing port 12 and the rear air blowing port 22 when the speed of the vehicle 100 is equal to or less than a predetermined speed. According to such a mode, for example, when a strong airflow does not occur by the movement of the vehicle 100, air can be blown from both the front air blowing port 12 and the rear air blowing port 22. Therefore, it is possible to perform air conditioning more efficiently compared to the case where air is blown only from either one of the front air blowing port 12 and the rear air blowing port 22.

(E4) In the embodiments described above, the control unit 30 determines the traveling direction of the vehicle 100 from the directions of the steering wheels 120 of the vehicle 100. The configuration is not limited thereto, and the control unit 30 may determine the traveling direction of the vehicle 100 from the detection result of a gyro sensor mounted on the vehicle 100, for example.

(E5) In the embodiments described above, the rear wheels of the vehicle 100 are the steering wheels 120. The configuration is not limited thereto, and the front wheels of the vehicle 100 may be the steering wheels 120. Further, both the front and rear wheels of the vehicle 100 may be the steering wheels 120.

(E6) In the second embodiment described above, in the air conditioning device 110B, the front air blowing port 12 includes the first front air blowing port 12a and the second front air blowing port 12b, and the rear air blowing port 22 includes the first rear air blowing port 22a and the second rear air blowing port 22b. Instead, the configuration of the air conditioning device 110B may be such that only the rear air blowing port 22 includes a plurality of air blowing ports, whereas the front air blowing port 12 includes only one air blowing port. Alternatively, the configuration of the air conditioning device 110B may be such that only the front air blowing port 12 includes a plurality of air blowing ports, whereas the rear air blowing port 22 includes only one air blowing port.

(E7) In the second embodiment described above, the air conditioning device 110B may be provided with the wind direction adjusting unit 50. The wind direction adjusting unit 50 is, for example, a damper provided in the first rear air blowing port 22a and the second rear air blowing port 22b to adjust the air volume. The control unit 30 controls the wind direction adjusting unit 50 to control the air volume of the first rear air blowing port 22a and the second rear air blowing port 22b, thereby changing the air blowing direction of the rear air blowing port 22 to the right and left. More specifically, the control unit 30 performs control so that air is blown from only the first rear air blowing port 22a and air is not blown from the second rear air blowing port 22b, thereby changing the air blowing direction of the rear air blowing port 22 to the left direction with respect to the traveling direction of the vehicle 100.

(E8) In the third embodiment described above, the wind direction adjusting unit 50 is a louver provided in the rear air blowing port 22 and a motor for driving the louver. Instead, the configuration may be such that the wind direction adjusting unit 50 changes the direction of the rear duct 20 to change the direction of the rear air blowing port 22 itself.

(E9) In the third embodiment described above, the wind direction adjusting unit 50 is provided only in the rear air blowing port 22. The configuration is not limited thereto, and the wind direction adjusting unit 50 may be also provided in the front air blowing port 12. It is preferable that the air conditioning device 110C includes the wind direction adjusting unit 50 that can change, to the right and left, the air blowing direction of at least the air blowing port on the same side as the steering wheels 120 with respect to the boarding position P1, of the front air blowing port 12 and the rear air blowing port 22.

The present disclosure is not limited to the embodiments described above, and can be implemented with various configurations without departing from the spirit thereof. For example, technical features in the embodiments corresponding to technical features in each mode described in SUMMARY can be replaced or combined as appropriate, to solve the issues described above or to achieve some or all of the effects described above. Also, if the technical features are not described as essential in the present specification, they may be deleted as appropriate.

What is claimed is:

1. An air conditioning device mounted on a vehicle in which a cabin on which an occupant boards is open to an outside of the vehicle, the air conditioning device comprising:
    a front air blowing port provided further forward than a boarding position on which the occupant boards in a front-rear direction of the vehicle to blow temperature-adjusted air toward the boarding position;
    a rear air blowing port provided further rearward than the boarding position in the front-rear direction of the vehicle to blow temperature-adjusted air toward the boarding position; and
    a control unit for controlling the air conditioning device, wherein
    the control unit
        performs control to stop blowing the air from the rear air blowing port and to blow the air from the front air blowing port when the vehicle travels forward, and
        performs control to stop blowing the air from the front air blowing port and to blow the air from the rear air blowing port when the vehicle travels rearward.

2. The air conditioning device according to claim 1, wherein when a speed of the vehicle is equal to or less than a predetermined speed, the control unit performs control to blow the air from the front air blowing port and the rear air blowing port.

3. The air conditioning device according to claim 1, wherein the vehicle is a working vehicle that lifts a placed object to transport the object.

4. The air conditioning device according to claim 1, wherein the rear air blowing port includes a first rear air blowing port provided on a right portion of the vehicle and a second rear air blowing port provided on a left portion of the vehicle.

5. The air conditioning device according to claim 1, wherein the front air blowing port includes a first front air blowing port provided on a right portion of the vehicle and a second front air blowing port provided on a left portion of the vehicle.

6. The air conditioning device according to claim 1, wherein:
    the vehicle includes
        a steering wheel that supports and travels the vehicle, and changes a traveling direction of the vehicle, and
        another wheel that supports and travels the vehicle together with the steering wheel;
    the air conditioning device includes a wind direction adjusting unit able of changing, to the right and left, an air blowing direction of at least an air blowing port on the same side as the steering wheel with respect to the boarding position, of the front air blowing port and the rear air blowing port; and
    when the vehicle changes the traveling direction while traveling in a direction from the other wheel toward the steering wheel, the control unit controls the wind direction adjusting unit such that the air blowing port on the same side as the steering wheel blows the air in a direction adjusted to a direction toward which the vehicle changes.

* * * * *